(12) United States Patent
Yuan

(10) Patent No.: US 9,613,148 B2
(45) Date of Patent: Apr. 4, 2017

(54) METHOD AND SYSTEM FOR DETERMINING PROPERTY OF USER IN SOCIAL NETWORK PLATFORM

(71) Applicant: TENCENT TECHNOLOGY (SHENZHEN) COMPANY LIMITED, Shenzhen (CN)

(72) Inventor: Changwen Yuan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/100,504

(22) PCT Filed: Feb. 3, 2015

(86) PCT No.: PCT/CN2015/072136
§ 371 (c)(1),
(2) Date: Jul. 8, 2016

(87) PCT Pub. No.: WO2015/081912
PCT Pub. Date: Jun. 11, 2015

(65) Prior Publication Data
US 2016/0306884 A1    Oct. 20, 2016

(30) Foreign Application Priority Data

Dec. 4, 2013   (CN) .......................... 2013 1 0645959

(51) Int. Cl.
*G06F 17/30* (2006.01)
(52) U.S. Cl.
CPC .. *G06F 17/30864* (2013.01); *G06F 17/30867* (2013.01)

(58) Field of Classification Search
CPC .......... G06Q 30/0253; G06Q 30/0255; G06Q 30/0256; G06Q 30/0245
See application file for complete search history.

(56) References Cited

U.S. PATENT DOCUMENTS

2010/0199356 A1    8/2010   Krishnamurth et al.
2011/0276921 A1    11/2011  Long
(Continued)

FOREIGN PATENT DOCUMENTS

CN    102906741 A    1/2013
CN    103309957 A    9/2013

OTHER PUBLICATIONS

Written Opinion (English translation), International application No. PCT/CN2015/072136, dated Apr. 29, 2015.
(Continued)

*Primary Examiner* — Cheryl Lewis
(74) *Attorney, Agent, or Firm* — Marshall, Gerstein & Borun LLP

(57) ABSTRACT

A method and system for determining a property of a user in a social network platform are provided according to some embodiments of the present disclosure. The method includes: determining a property of a seed user in the social network platform; determining a property of a social network platform function interacting with a user according to a property of the user in the social network platform; and determining a property of a user interacting with a social network platform function according to a property of the social network platform function. By the embodiments of the present disclosure, the property of the user in the social network platform can be determined accurately.

11 Claims, 5 Drawing Sheets

(56) References Cited

U.S. PATENT DOCUMENTS

2012/0011006 A1\* 1/2012 Schultz et al. ......... G06Q 10/10
  705/14.73
2013/0018968 A1\* 1/2013 Pennacchiotti et al. ........ G06Q
  10/10709/206
2013/0159011 A1 6/2013 Leville

OTHER PUBLICATIONS

Search Report in International Application No. PCT/CN2015/072136 dated Apr. 29, 2015, 4 pages.

\* cited by examiner

METHOD AND SYSTEM FOR DETERMINING PROPERTY OF USER IN SOCIAL NETWORK PLATFORM

This application claims the benefit and priority of Chinese Patent Application No. 201310645959.6, entitled "Method and System for Determining Property of User in Social Network Platform" and filed on Dec. 4, 2013. The entire disclosures of each of the above applications are incorporated herein by reference.

TECHNICAL FIELD

The present disclosure relates to social network technologies, and more particularly to a method and system for determining a property of a user in a social network platform.

BACKGROUND

Properties of a user in a social network platform include static properties and dynamic properties. The static properties include gender, age, education information and work information of the user. The static properties are usually static and unchangeable. The dynamic properties include interests, hobbies and constant concerns of the user. The dynamic properties are usually dynamic and changeable.

Usually, the dynamic properties of the user may be obtained through performing word segmentation analysis for messages posted or forwarded by the user and roughly determining the interests and hobbies of the user.

For example, a keyword of "Guangzhou Evergrande" belongs to a category of sport football interest. When the messages posted or forwarded by the user include multiple keywords belonging to the category of sport football interest, the sport football interest may be added to the dynamic properties of the user.

A conventional method for determining a dynamic property is usually based on the word segmentation analysis of a message. A keyword obtained through the word segmentation analysis cannot always reflect the interests of a user, so the determined dynamic property may be inaccurate.

SUMMARY

A method for determining a property of a user in a social network platform is provided according to an embodiment of the present disclosure, so as to accurately determine the property of the user in the social network platform.

A system for determining a property of a user in a social network platform is provided according to an embodiment of the present disclosure, so as to accurately determine the property of the user in the social network platform.

The solution provided by the embodiments of the present disclosure is implemented as follows.

A method for determining a property of a user in a social network platform includes:

determining a property of a seed user in the social network platform;

determining a property of a social network platform function interacting with a user according to a property of the user in the social network platform; and determining a property of a user interacting with a social network platform function according to a property of the social network platform function.

A system for determining a property of a user in a social network platform includes a seed breeding subsystem and a self-study subsystem;

the seed breeding subsystem is to determine a property of a seed user in a social network platform, and send the property of the seed user to the self-study subsystem; and the self-study subsystem is to determine a property of a social network platform function interacting with a user according to a property of the user in the social network platform; and is to determine a property of a user interacting with a social network platform function according to a property of the social network platform function.

In the method and system for determining the property of the user in the social network platform provided by the embodiments of the present disclosure, the social network platform functions interacting with the user in the social network platform, such as a webpage short Uniform Resource Locator (URL), a topic, a message, an activity, a vote, an application and so on, are used as a bridge for determining the property of the user, thereby accurately determining the property of the user.

DETAILED DESCRIPTION

In order to make the technical solution and merits of the present disclosure clearer, the present disclosure will be illustrated in detail hereinafter with reference to the accompanying drawings and specific embodiments.

Figure 1:
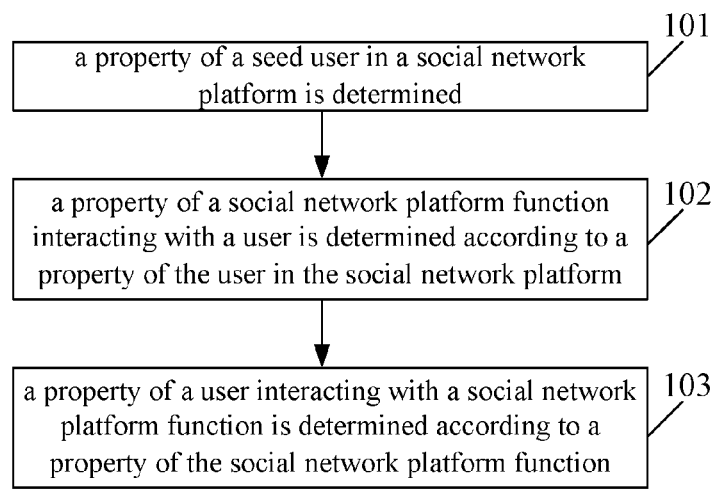
FIG. 1 is a flowchart illustrating a method for determining a property of a user in a social network platform according to an embodiment of the present disclosure.

FIG. 1 is a flowchart illustrating a method for determining a property of a user in a social network platform according to an embodiment of the present disclosure. As shown in FIG. 1, the method includes following blocks.

At block 101, a property of a seed user in a social network platform is determined.

At block 102, a property of a social network platform function interacting with a user is determined according to a property of the user in the social network platform.

At block 103, a property of a user interacting with a social network platform function is determined according to a property of the social network platform function.

In an embodiment of the present disclosure, a webpage short URL is used as a bridge for calculating the property of the user. In another embodiment, if a social network platform function, for example, a topic, a message, an activity, a vote or an application, can reflect a stronger subjective will of the user when the user uses the social network platform function, the social network platform function may replace the webpage short URL.

It should be noted that, the user interacting with the webpage short URL in the embodiments of the present disclosure includes that the user posts a message containing the webpage short URL, forwards a message containing the webpage short URL, or clicks the webpage short URL. Since the user has a stronger subjective will to interact with the webpage short URL, the property of the webpage short URL can reflect the property of the user interacting with the webpage short URL to some degree, vice versa.

Besides the above interaction mode, other interaction modes that can reflect the subjective will of the user may also be used, which are not limited in the embodiments of the present disclosure.

Figure 2:
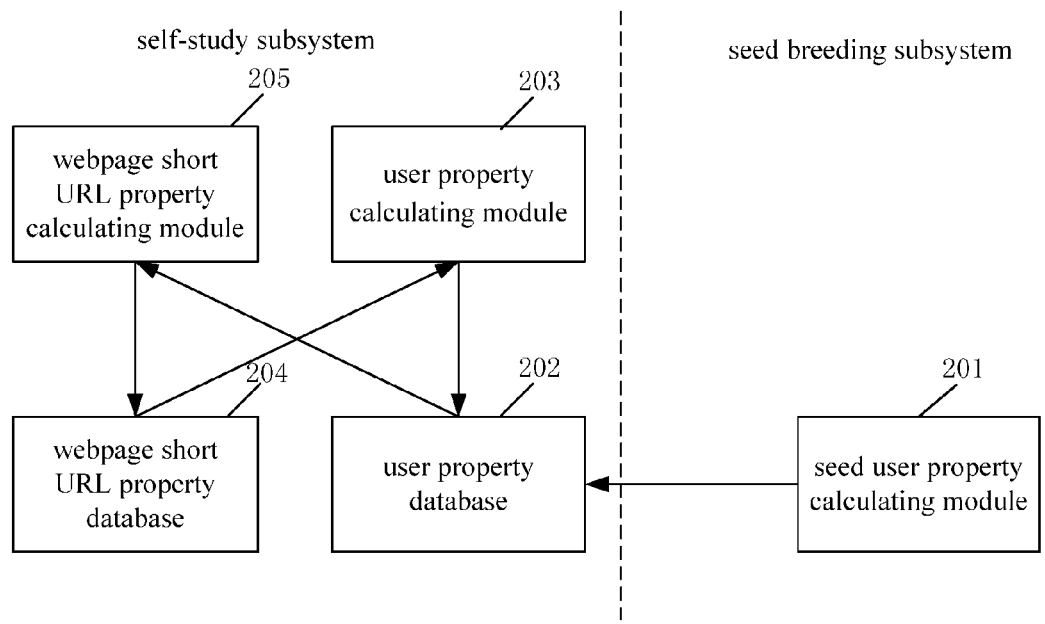
FIG. 2 is a diagram illustrating the structure of a system for determining a property of a user in a social network platform according to an embodiment of the present disclosure.

FIG. 2 is a diagram illustrating the structure of a system for determining a property of a user in a social network platform according to an embodiment of the present disclosure. In this embodiment, the system for determining the property of the user in the social network platform may be a user property calculating model. The user property calculating model may include two parts, as shown in FIG. 2. The left part of FIG. 2 is a self-study subsystem. The self-study subsystem may study and calculate a property of a webpage short URL and a property of the user according to the interaction between the user and the webpage short URL. The right part of FIG. 2 is a seed breeding subsystem. The seed breeding subsystem may determine one or more initial seed users, determine properties of the seed users, and use the properties of the seed users as study features of the self-study subsystem.

The two parts of the user property calculating model will be described hereinafter.

The seed breeding subsystem includes a seed user property calculating module 201.

The seed user property calculating module 201 may determine a seed user.

The seed user property calculating module 201 may determine a property of the seed user according to a user tag input by the seed user and a pre-stored relationship between user tags and user properties. For example, when the user tag input by the seed user is "Internet", it is determined that the property of the seed user is "science and technology". When the user tag input by the seed user is "cloud technology", it is determined that the property of the seed user is also "science and technology". In this case, it can be ensured that the property of the seed user is uniform and not conflictive.

The property of the seed user determined by the seed user property calculating module 201 may be checked and modified manually, so as to ensure that the property of the seed user is as accurate as possible.

The self-study subsystem includes a user property database 202, a user property calculating module 203, a webpage short URL property database 204 and a webpage short URL property calculating module 205.

The user property database 202 obtains the property of the seed user calculated by the seed breeding subsystem. The webpage short URL property calculating module 205 calculates a property of a webpage short URL according to the interaction between a user and the webpage short URL and according to a property of the user stored in the user property database 202, and sends a calculation result to the webpage short URL property database 204. The user property calculating module 203 calculates a property of a user according to the interaction between the user and a webpage short URL and according to a property of the webpage short URL stored in the webpage short URL property database 204, and sends a calculation result to the user property database 202. The user property calculating module 203 and the webpage short URL property calculating module 205 periodically calculate the property of the user and the property of the webpage short URL respectively, so as to calculate the final property of the user in the social network platform.

The self-study subsystem may determine the property of the user through two calculation processes.

One of the two calculation processes is a process of calculating the property of the webpage short URL, which includes: obtaining properties of all users interacting with the webpage short URL, and if the number of users having a property is a largest number, determining the property as the property of the webpage short URL. For example, three users A, B and C interact with the webpage short URL, the properties of the user A is property a and property b, the properties of the user B is the property b and property c, and the properties of the user C is the property a, the property b and the property c, the property of the webpage short URL is determined as the property b.

The other one of the two calculation processes is a process of calculating the property of the user. The property of the user may be determined according to the property of the webpage short URL interacting with the user, or may be determined according to both the property of the webpage short URL interacting with the user and a property of a webpage short URL interacting with a buddy followed by the user. For example, if the property of the webpage short URL interacting with the user A is the property b, and the property c and the property b most frequently appear in the property of the webpage short URL interacting with the buddy followed by the user A, the property of the user A is determined as the property b.

In the user property calculating model, the property of the webpage short URL and the property of the user can testify each other to increase the accuracy of other side's data, so that the property of the user can be adjusted dynamically along with the interaction between the user and the webpage short URL.

Figure 3:
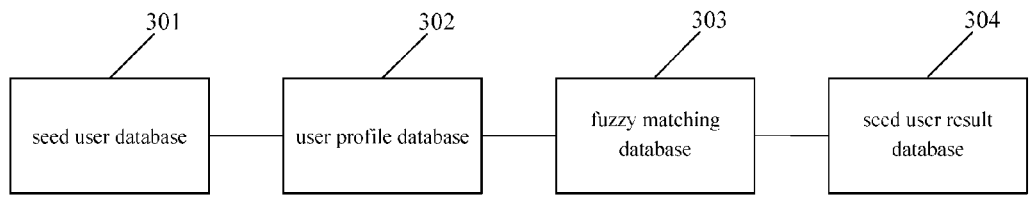
FIG. 3 is a diagram illustrating the structure of a storage system according to an embodiment of the present disclosure.
Figure 4:
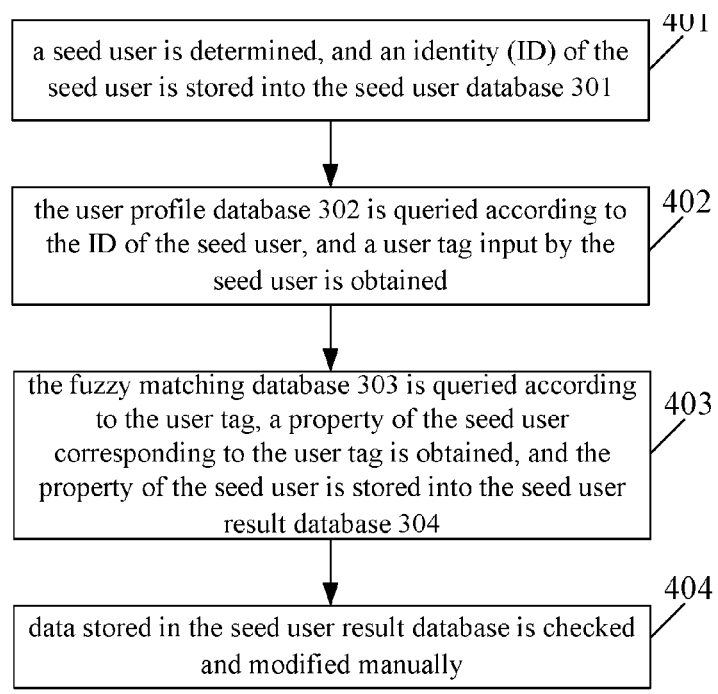
FIG. 4 is a flowchart illustrating a method for determining a property of a seed user according to an embodiment of the present disclosure.

FIG. 3 is a diagram illustrating the structure of a storage system according to an embodiment of the present disclosure. As shown in FIG. 3, the storage system includes a seed user database 301, a user profile database 302, a fuzzy matching database 303 and a seed user result database 304. According to the storage system shown in FIG. 3, FIG. 4 shows a flowchart illustrating a method for determining a property of a seed user according to an embodiment of the present disclosure. As shown in FIG. 4, the method includes following blocks.

At block 401, a seed user is determined, and an identity (ID) of the seed user is stored into the seed user database 301. The seed user is a high-quality user whose profiles have been completed. In this embodiment, a Very Important People (VIP) user whose profiles have been completed is taken as the seed user.

At block 402, the user profile database 302 is queried according to the ID of the seed user, and a user tag input by the seed user is obtained.

At block 403, the fuzzy matching database 303 is queried according to the user tag, a property of the seed user corresponding to the user tag is obtained, and the property of the seed user is stored into the seed user result database 304.

The fuzzy matching database 303 stores a relationship between user tags and user properties in advance. If the user tag input by the user is improper, an accurate property of the user may not be obtained. Through performing block 403, this case may be avoided. For example, the user tag input by the user is "American drama", it can be determined, according to the pre-stored relationship between "American drama" and "movie lover", that the property of the user is "movie lover".

The relationship stored in the fuzzy matching database may be calculated periodically, and may be modified and extended according to a calculation result.

At block 404, data stored in the seed user result database is checked and modified manually.

In order to reduce the workload of manual check, a user with believable profiles should be selected as the seed user.

The property of the seed user determined by the seed breeding subsystem is accurate and believable. The seed user is required to be active enough, so that enough social data can participate in the calculation of the self-study system.

Figure 5:
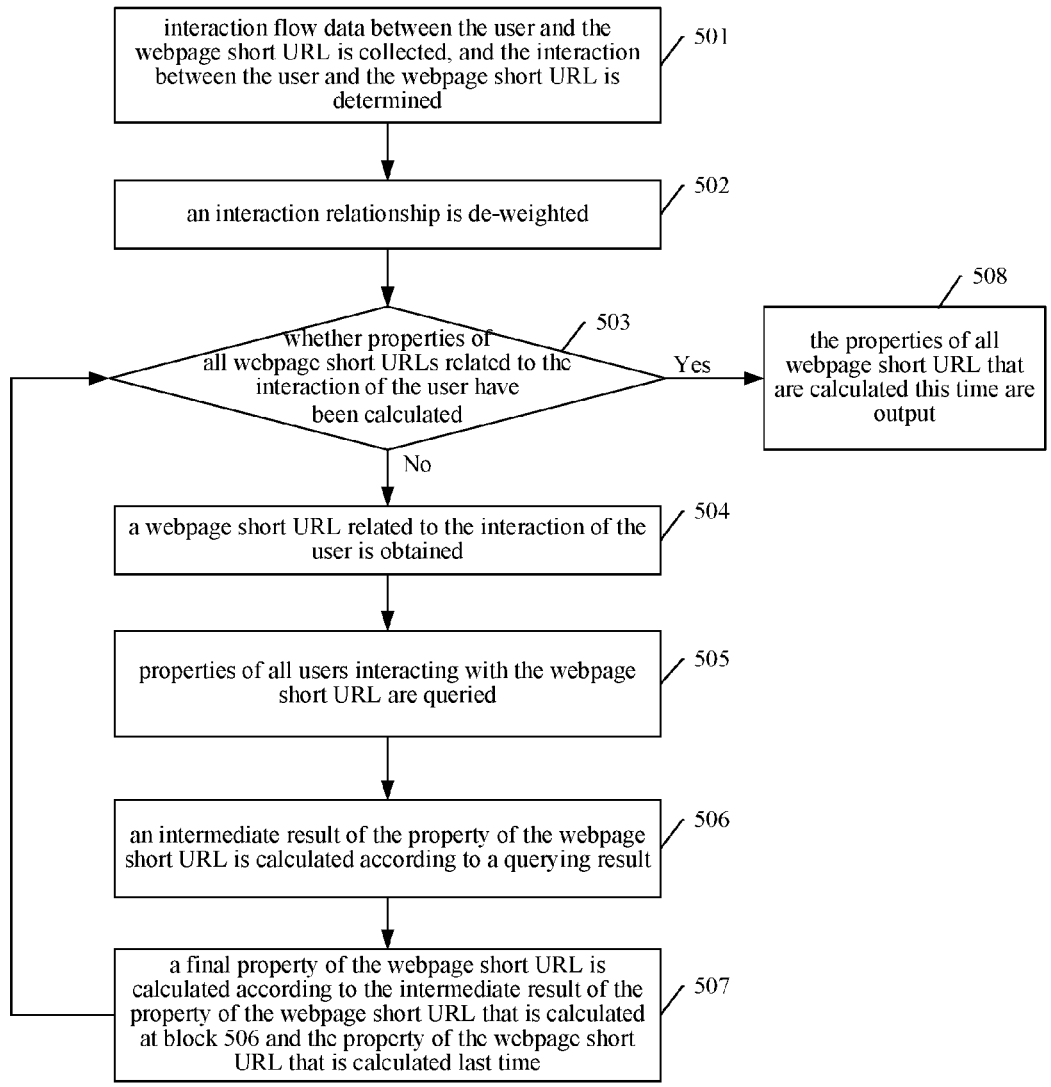
FIG. 5 is a flowchart illustrating a method for calculating a property of a webpage short URL according to an embodiment of the present disclosure.

FIG. 5 is a flowchart illustrating a method for calculating a property of a webpage short URL according to an embodiment of the present disclosure. As shown in FIG. 5, the method includes following blocks.

At block 501, interaction flow data between the user and the webpage short URL is collected, and the interaction between the user and the webpage short URL is determined.

In this embodiment, the flow data may be collected by taking one day as a time slice. For example, the flow data of the day before is collected and calculated every day, rather than calculate all flow data every time.

At block 502, an interaction relationship is de-weighted. Specifically, if a user interacts with a webpage short URL for many times, one interaction between the user and the webpage short URL is reserved. Through performing block 502, it may be avoided that the property of the webpage short URL is calculated inaccurately because some users forward the webpage short URL for many times.

At block 503, it is determined whether properties of all webpage short URLs related to the interaction of the user have been calculated; if it is determined that the properties of all webpage short URLs have not been calculated, block 504 is performed; if it is determined that the properties of all webpage short URLs have been calculated, block 508 is performed.

At block 504, a webpage short URL related to the interaction of the user is obtained.

At block 505, properties of all users interacting with the webpage short URL are queried. If a user has no property when the property of the user is queried, null may be returned, which does not influence the accuracy of calculation.

At block 506, an intermediate result of the property of the webpage short URL is calculated according to a querying result obtained at block 505.

For example, three user properties most frequently appearing in the querying result are taken as the intermediate result of the property of the webpage short URL, and a ratio of the number of appearances of each user property to the total number of appearances of the three user properties is taken as a weight of the user property. For example, when users interact with the webpage short URL, user properties most frequently appearing in this querying result are the property a, the property b and the property c. If the number of appearances of the property a is 50, the number of appearances of the property b is 40 and the number of appearances of the property c is 10, the intermediate result of the property of the webpage short URL is the property a (whose weight is 50%), the property b (whose weight is 40%) and the property c (whose weight is 10%). In this embodiment, the number of user properties taking as the intermediate result of the property of the webpage short URL may be determined as required, which will not be limited in the embodiments of the present disclosure.

At block 507, a final property of the webpage short URL is calculated according to the intermediate result of the property of the webpage short URL that is calculated at block 506 and the property of the webpage short URL that is calculated last time.

For example, the property of the webpage short URL that is calculated last time is the property a (whose weight is 30%), the property b (whose weight is 60%) and a property d (whose weight is 10%), and the intermediate result of the property of the webpage short URL that is calculated this time is the property a (whose weight is 50%), the property b (whose weight is 40%) and the property c (whose weight is 10%). Accordingly, the weight of each property that is calculated last time may be multiplied by a fixed value (which should be smaller than 1, for example, 0.5) to obtain a value, the value is added by the weight of the property in the intermediate result that is calculated this time to obtain a final weight, and three properties with the largest final weights are taken as the final property of the webpage short URL. Specifically, calculation results are described as follows:

the final weight of the property $a=30\%*0.5+50\%=65\%$, the final weight of the property $b=60\%*0.5+40\%=70\%$, the final weight of the property $c=10\%$, and the final weight of the property $d=10\%*0.5=5\%$.

According to the above calculation results, three properties with the largest final weights are taken as the final property of the webpage short URL, i.e., the property b (whose weight is 70%), the property a (whose property is 65%) and the property c (whose property is 10%).

In another embodiment, the intermediate result calculated at block 506 may be taken as the final property of the webpage short URL. That is, if the property of the webpage short URL has be determined previously, the intermediate result calculated at block 506 may replace the property of the webpage short URL that has been determined previously.

After calculating the final property of the webpage short URL, block 503 is performed to determine whether the properties of all webpage short URLs have been calculated.

At block 508, the properties of all webpage short URL that are calculated this time are output, and this calculation process terminates.

Figure 6:
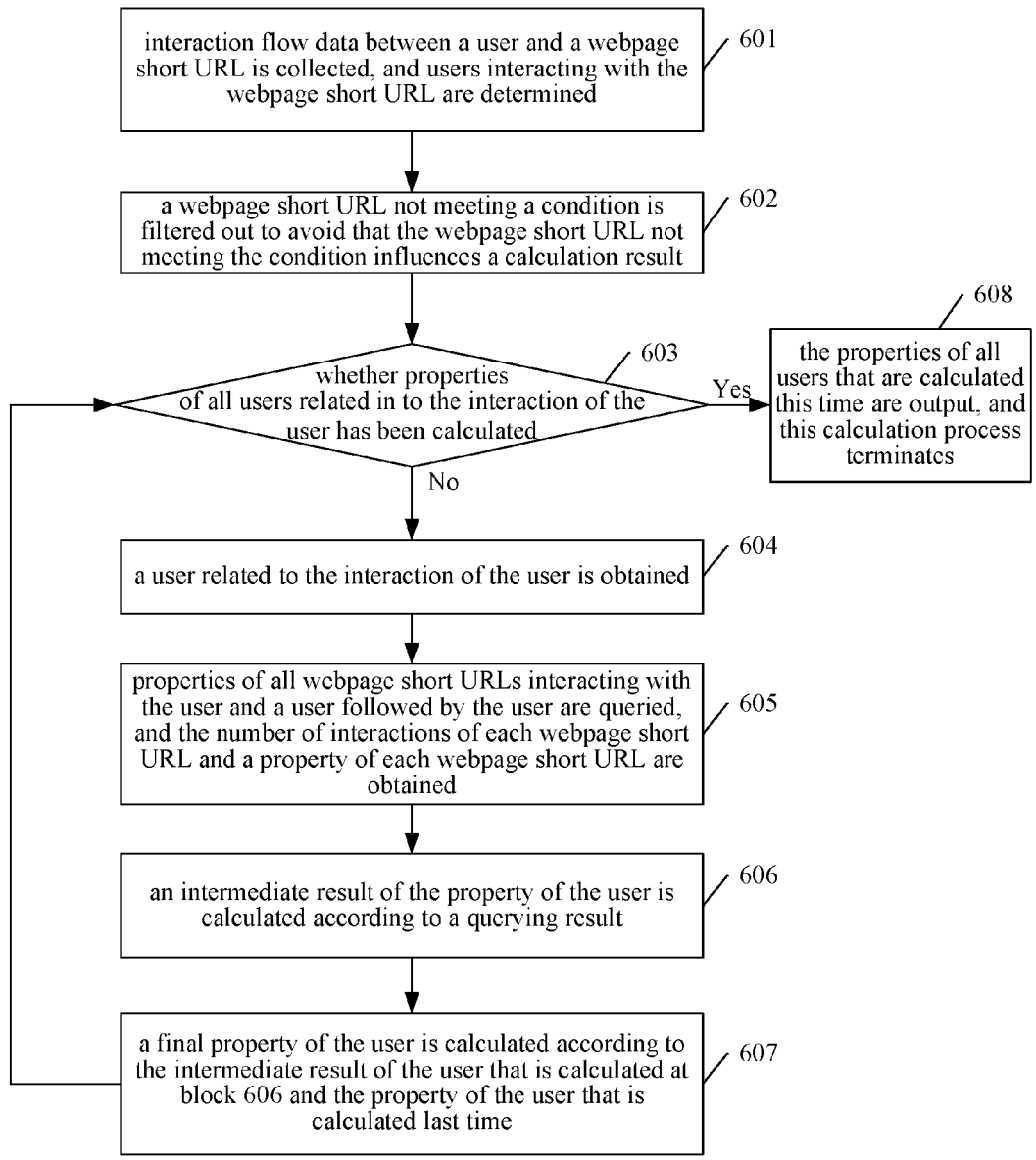
FIG. 6 is a flowchart illustrating a method for calculating a property of a user according to an embodiment of the present disclosure.

FIG. 6 is a flowchart illustrating a method for calculating a property of a user according to an embodiment of the present disclosure. As shown in FIG. 6, the method includes following blocks.

At block 601, interaction flow data between a user and a webpage short URL is collected, and users interacting with the webpage short URL are determined.

The calculation range may be narrowed because only the users interacting with the webpage short URL are selected. The self-study system may collect user properties through taking one day as a unit.

At block 602, a webpage short URL not meeting a condition is filtered out to avoid that the webpage short URL not meeting the condition influences a calculation result.

Through a simple algorithm, it may be determined whether a webpage short URL meets the condition. The algorithm includes: calculating a forwarding ratio of the webpage short URL, that is, the number of forwarding operations of the webpage short URL/the number of original creations of the webpage short URL; and if the forwarding ratio is smaller than a predefined threshold, it is determined that the webpage short URL does not meet the condition.

At block 603, it is determined whether properties of all users related to the interaction of the user has been calculated; if it is determined that the properties of all users have not been calculated, block 604 is performed; if it is determined that the properties of all users have been calculated, block 608 is performed.

At block 604, a user related to the interaction of the user is obtained.

At block 605, properties of all webpage short URLs interacting with the user and a user followed by the user (called the followed user of the user) are queried, and the number of interactions of each webpage short URL and a property of each webpage short URL are obtained. Since the webpage short URL not meeting the condition has been filtered out at block 602, the webpage short URLs at block 605 all meet the condition.

If a webpage short URL has no property when the property of the webpage short URL is queried, null may be returned, which does not influence the accuracy of calculation.

At block 606, an intermediate result of the property of the user is calculated according to a querying result obtained at block 605.

A calculation method includes following processes.

At process I), the weight of each property of each webpage short URL is multiplied by the number of interactions of the webpage short URL to obtain an intermediate value, all intermediate values corresponding to the properties of all webpage short URLs are added to obtain a result, and the result is taken as a ratio of the property.

At process II), ratios of all properties are added to obtain a total ratio.

At process III), the ratio of each property is divided by the total ratio obtained at process II) to obtain a weight of the property.

At process IV), three properties with the largest weights are taken as the intermediate result of the property of the user.

For example, there are two users followed by user A, which include user B and user C.

Webpage short URLs interacting with at least one of the users A, B and C include URL1 and URL2. Properties of URL1 include property a (whose weight is 50%), property b (whose weight is 30%) and property c (whose weight is 10%), and the number of interactions of URL1 is 3. Properties of URL2 include property d (whose weight is 70%), property b (whose weight is 20%) and property a (whose weight is 5%), and the number of interactions of URL2 is 2.

According to the above querying results, calculation results are described as follows:

a ratio of the property $a=50\%*3+5\%*2=1.6$, a ratio of the property $b=30\%*3+20\%*2=1.3$, a ratio of the property $c=10\%*3=0.3$, a ratio of the property $d=70\%*2=1.4$, an intermediate weight of the property $a=1.6/(1.6+1.3+0.3+1.4)=35\%$, an intermediate weight of the property $b=1.3/(1.6+1.3+0.3+1.4)=28\%$, an intermediate weight of the property $c=0.3/(1.6+1.3+0.3+1.4)=7\%$, and an intermediate weight of the property $d=1.4/(1.6+1.3+0.3+1.4)=30\%$.

Three properties with the largest intermediate weights are taken as an intermediate result of the property of the user A, i.e., the property a (whose weight is 35%), the property b (whose weight is 30%) and the property c (whose weight is 28%).

At block 607, a final property of the user is calculated according to the intermediate result of the user that is calculated at block 606 and the property of the user that is calculated last time, and block 603 is performed.

For example, the property of the user A that is calculated last time is the property a (whose weight is 20%), the property c (whose weight is 30%) and the property d (whose weight is 40%), and the intermediate result of the property of the user A that is calculated this time is the property a (whose weight is 35%), the property d (whose weight is 30%) and the property b (whose weight is 28%). Accordingly, the weight of each property that is calculated last time may be multiplied by a fixed value (which should be smaller than 1, for example, 0.5) to obtain a value, the value is added by the weight of the property in the intermediate result that is calculated this time to obtain a final weight, and three properties with the largest final weights are taken as the final result of the property of the user A. Specifically, calculation results are described as follows:

the final weight of the property $a=20\%*0.5+35\%=45\%$, the final weight of the property $b=28\%$, the final weight of the property $c=30\%*0.5=15\%$, and the final weight of the property $d=40\%*0.5+30\%=50\%$.

According to the above calculation results, three properties with the largest final weights are taken as the final property of the user A, i.e., the property d (whose weight is 50%), the property a (whose property is 45%) and the property b (whose property is 28%).

In another embodiment, the intermediate result calculated at block 606 may be taken as the final property of the user. That is, if the property of the user has been determined previously, the intermediate result calculated at block 606 may replace the property of the user that has been determined previously.

At block 608, the properties of all users that are calculated this time are output, and this calculation process terminates.

In the above embodiment of the present disclosure, a webpage short URL is used as a bridge for calculating the property of the user in the social network platform. In another embodiment, if a social network platform function can reflect a stronger subjective will of the user when the user uses the social network platform function, the social network platform function may replace the webpage short URL. The stronger subjective will refers to that, if the user have a remembering cost to voluntarily do a thing, the thing can reflect the subjective will of the user to some degree, i.e., the property of the user. For example, if the user participates in the discussion of a topic, it can be deemed that there is an interaction relationship between the user and the topic, and thus the topic may be taken as a bridge for determining the property of the user in the social network platform. Or, if the user posts, reads or forwards a message, it can be deemed that there is an interaction relationship between the user and the message, and thus the message may be taken as a bridge for determining the property of the user in the social network platform.

A system for determining a property of a user in a social network platform is provided according to an embodiment of the present disclosure, which includes a seed breeding subsystem and a self-study subsystem.

The seed breeding subsystem may determine a property of a seed user in a social network platform, and send the property of the seed user to the self-study subsystem.

The self-study subsystem may determine a property of a social network platform function interacting with a user according to a property of the user in the social network platform. The self-study subsystem may also determine a property of a user interacting with a social network platform function according to a property of the social network platform function.

In the system, the social network platform function may be a webpage short URL, a topic, a message, an activity, a vote or an application.

A process of interacting with the webpage short URL by the user includes that the user accesses the webpage short URL or the user posts or forwards a message containing the webpage short URL.

In the system, the seed breeding subsystem determines the property of the seed user in the social network platform through a process of:

determining the seed user in the social network platform;
obtaining a user tag input by the seed user;
determining the property of the seed user according to the user tag input by the seed user and a pre-stored relationship between user tags and user properties; and
checking and modifying the property of the seed user.

In the system, the self-study subsystem includes a user property database, a social network platform function property calculating module, a social network platform function property database and a user property calculating module.

The user property database may receive and store the property of the seed user sent by the seed breeding subsystem, and receive and store the property of the user sent by the user property calculating module.

The social network platform function property calculating module may determine the property of the social network platform function interacting with the user according to the property of the user stored in the user property database, and send the property of the social network platform function to the social network platform function property database.

The social network platform function property database may receive the property of the social network platform function sent by the social network platform function property calculating module.

The user property calculating module may determine the property of the user interacting with the social network platform function according to the property of the social network platform function stored in the social network platform function property database, and send the property of the user to the user property database.

In the system, the social network platform function property calculating module determines the property of the social network platform function interacting with the user through a process of:

obtaining social network platform functions interacting with the user in a predefined period; and
performing following processes for each obtained social network platform function:

at process A1), properties of all users interacting with the social network platform function are queried;

at process B1), N properties most frequently appearing in a querying result are taken as an intermediate result of the property of the social network platform function, and a ratio of the number of appearances of each property to the total number of appearances of the N properties is taken as a weight of the property, wherein N is a predefined integer; and at process C1), the intermediate result is taken as a final property of the social network platform function; or the weight of the property of the social network platform function that has been calculated last time is multiplied by a predefined ratio to obtain a value, the value is added by the weight of the property in the intermediate result that is calculated this time to obtain a final weight, and N properties with the largest final weights are taken as the final property of the social network platform function.

The user property calculating module determines the property of the user interacting with the social network platform function, such as the webpage short URL, the topic or the message, through a process of:

obtaining users interacting with the social network platform function in a predefined period; and
performing following processes for each obtained user:

at process A2), all social network platform functions interacting with the user and a user followed by the user are queried, and the number of interactions of each social network platform function and a property of each social network platform function are obtained;

at process B2), an intermediate result of the property of the user is calculated according to a querying result; and at process C2), the intermediate result is taken as a final property of the user; or the weight of the property of the user that has been calculated last time is multiplied by a predefined ratio to obtain a value, the value is added by the weight of the property in the intermediate result that is calculated this time to obtain a final weight, and N properties with the largest final weights are taken as the final property of the user, wherein N is a predefined integer.

Process B2) is implemented as follows:

the weight of each property of each social network platform function is multiplied by the number of interactions of the social network platform function to obtain an intermediate value, all intermediate values corresponding to the property of all social network platform functions are added to obtain a result, and the result is taken as a ratio of the property;

ratios of all properties are added to obtain a total ratio;
the ratio of each property is divided by the total ratio to obtain a weight of the property; and
N properties with the largest weights are taken as the intermediate result of the property of the user.

When the social network platform function is a webpage short URL, the social network platform function at process A2) may be a webpage short URL whose a ratio of the number of forwarding operations of the webpage short URL to the number of original creations of the webpage short URL is larger than a predefined threshold.

Figure 7:
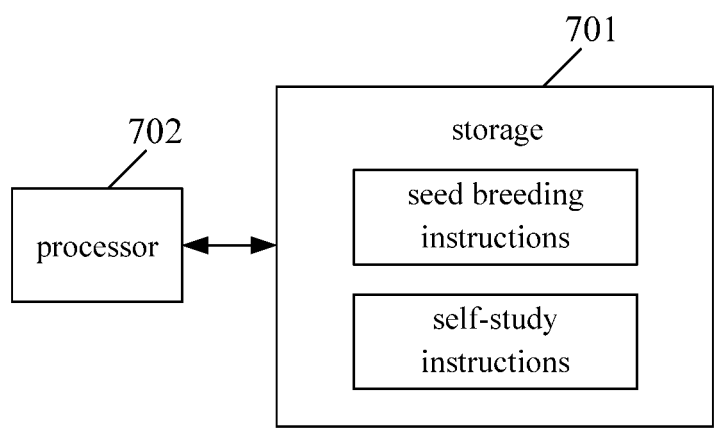
FIG. 7 is a diagram illustrating the structure of an apparatus for determining a property of a user in a social network platform according to an embodiment of the present disclosure.

FIG. 7 is a diagram illustrating the structure of an apparatus for determining a property of a user in a social network platform according to an embodiment of the present disclosure. The apparatus at least includes a storage 701 and a processor 702 communicating with the storage 701. The storage 701 may include seed breeding instructions and self-study instructions that can be executed by the processor 702. The storage 701 may be a non-transitory computer readable storage medium, and the seed breeding instructions and the self-study instructions may be machine readable instructions stored in the storage 701. The processor 702 may execute the machine readable instructions stored in the storage 701 to implement the method processes and system functions described in the above embodiments.

For example, the processor 702 may execute the seed breeding instructions to determine a property of a seed user in a social network platform, and execute the self-study instructions to determine a property of a social network platform function interacting with a user according to a property of the user in the social network platform, and determine a property of a user interacting with a social network platform function according to a property of the social network platform function.

In the method and system for determining a property of a user in the social network platform provided by the embodiments of the present disclosure, social network platform functions interacting with the user, such as a webpage short URL, a topic, a message, an activity, a vote or an application, are used as a bridge for determining the property of the user. According to the social property of the platform, the property of the social network platform function and the property of the user can be determined. The interest range of the user may be determined according to the property of the social network platform function interacting with the user, and may be determined again through the interest range of buddies followed by the user, thereby accurately determining the property of the user.

The foregoing is only preferred examples of the present disclosure and is not used to limit the protection scope of the present disclosure. Any modification, equivalent substitution and improvement without departing from the spirit and principle of the present disclosure are within the protection scope of the present disclosure.

What is claimed is:

1. A method for determining a property of a user in a social network platform, being executed on a hardware device, the method comprising:
determining a property of a seed user in the social network platform;
determining a property of a social network platform function interacting with a user according to a property of the user in the social network platform; and
determining a property of a user interacting with a social network platform function according to a property of the social network platform function;

wherein the determining the property of the seed user in the social network platform comprises:
determining the seed user in the social network platform;
obtaining a user tag input by the seed user;
determining the property of the seed user according to the user tag input by the seed user and a pre-stored relationship between user tags and user properties; and
checking and modifying the property of the seed user;
wherein determining the property of the social network platform function interacting with the user according to the property of the user in the social network platform comprises:
obtaining social network platform functions interacting with the user in a predefined period; and
performing processes for each obtained social network platform function:
at process A1), properties of all users interacting with the social network platform function are queried;
at process B1), N properties most frequently appearing in a querying result are taken as an intermediate result of the property of the social network platform function, and a ratio of the number of appearances of each property to the total number of appearances of the N properties is taken as a weight of the property, wherein N is a predefined integer; and
at process C1), the intermediate result is taken as a final property of the social network platform function; or the weight of the property of the social network platform function that has been calculated last time is multiplied by a predefined ratio to obtain a value, the value is added by the weight of the property in the intermediate result that is calculated this time to obtain a final weight, and N properties with the largest final weights are taken as the final property of the social network platform function.

2. The method of claim 1, wherein the social network platform function is a webpage short Uniform Resource Locator (URL), a topic, a message, an activity, a vote or an application;
the user interacting with the webpage short URL comprises: the user accessing the webpage short URL or the user posting or forwarding a message containing the webpage short URL.

3. The method of claim 1, wherein the determining the property of the user interacting with the social network platform function according to the property of the social network platform function comprises:
obtaining users interacting with the social network platform function in a predefined period; and
performing processes for each obtained user:
at process A2), all social network platform functions interacting with the user and a user followed by the user are queried, and the number of interactions of each social network platform function and a property of each social network platform function are obtained;
at process B2), an intermediate result of the property of the user is calculated according to a querying result; and
at process C2), the intermediate result is taken as a final property of the user; or a weight of the property of the user that has been calculated last time is multiplied by a predefined ratio to obtain a value, the value is added by a weight of the property in the intermediate result that is calculated this time to obtain a final weight, and N properties with the largest final weights are taken as the final property of the user, wherein N is a predefined integer.

4. The method of claim 3, wherein the process B2) comprises:
multiplying the weight of each property of each social network platform function by the number of interactions of the social network platform function to obtain an intermediate value, adding all intermediate values corresponding to the property of all social network platform functions to obtain a result, and taking the result as a ratio of the property;
adding ratios of all properties to obtain a total ratio;
dividing the ratio of each property by the total ratio to obtain a weight of the property; and
N properties with the largest weights are taken as the intermediate result of the property of the user.

5. The method of claim 3, wherein when the social network platform function is a webpage short URL, the social network platform function at the process A2) is a webpage short URL whose a ratio of the number of forwarding operation of the webpage short URL to the number of original creations of the webpage short URL is larger than a predefined threshold.

6. A system for determining a property of a user in a social network platform, comprising a seed breeding subsystem and a self-study subsystem, being executed on a hardware device, the system comprising;
a memory;
the seed breeding subsystem is to determine a property of a seed user in a social network platform, and send the property of the seed user to the self-study subsystem; and
the self-study subsystem is to determine a property of a social network platform function interacting with a user according to a property of the user in the social network platform; and is to determine a property of a user interacting with a social network platform function according to a property of the social network platform function;
wherein the seed breeding subsystem determines the property of the seed user in the social network platform through a process of:
determining the seed user in the social network platform;
obtaining a user tag input by the seed user;
determining the property of the seed user according to the user tag input by the seed user and a pre-stored relationship between user tags and user properties; and
checking and modifying the property of the seed user;
wherein the social network platform function property calculating module determines the property of the social network platform function interacting with the user through a process of:
obtaining social network platform functions interacting with the user in a predefined period; and
performing processes for each obtained social network platform function:
at process A1), properties of all users interacting with the social network platform function are queried;
at process B1), N properties most frequently appearing in a querying result are taken as an intermediate result of the property of the social network platform function, and a ratio of the number of appearances of each property to the total number of appearances of the N properties is taken as a weight of the property, wherein N is a predefined integer; and
at process C1), the intermediate result is taken as a final property of the social network platform function; or the weight of the property of the social network platform function that has been calculated last time is multiplied by a predefined ratio to obtain a value, the value is added by the weight of the property in the intermediate result that is calculated this time to obtain a final weight, and N properties with the largest final weights are taken as the final property of the social network platform function.

7. The system of claim 6, wherein the social network platform function is a webpage short Uniform Resource Locator (URL), a topic, a message, an activity, a vote or an application;
a process of the user interacting with the webpage short URL comprises: the user accessing the webpage short URL or the user posting or forwarding a message containing the webpage short URL.

8. The system of claim 6, wherein the self-study subsystem comprises a user property database, a social network platform function property calculating module, a social network platform function property database and a user property calculating module;
the user property database is to receive and store the property of the seed user sent by the seed breeding subsystem, and receive and store the property of the user sent by the user property calculating module;
the social network platform function property calculating module is to determine the property of the social network platform function interacting with the user according to the property of the user stored in the user property database, and send the property of the social network platform function to the social network platform function property database;
the social network platform function property database is to receive the property of the social network platform function sent by the social network platform function property calculating module; and
the user property calculating module is to determine the property of the user interacting with the social network platform function according to the property of the social network platform function stored in the social network platform function property database, and send the property of the user to the user property database.

9. The system of claim 8, wherein the user property calculating module determines the property of the user interacting with the social network platform function through a process of:
obtaining users interacting with the social network platform function in a predefined period; and
performing processes for each obtained user:
at process A2), all social network platform functions interacting with the user and a user followed by the user are queried, and the number of interactions of each social network platform function and a property of each social network platform function are obtained;
at process B2), an intermediate result of the property of the user is calculated according to a querying result; and
at process C2), the intermediate result is taken as a final property of the user; or the weight of the property of the user that has been calculated last time is multiplied by a predefined ratio to obtain a value, the value is added by the weight of the property in the intermediate result that is calculated this time to obtain a final weight, and N properties with the largest final weights are taken as the final property of the user, wherein N is a predefined integer.

10. The system of claim 9, wherein the process B2) comprises:

multiplying the weight of each property of each social network platform function by the number of interactions of the social network platform function to obtain an intermediate value, adding all intermediate values corresponding to the property of all social network platform functions to obtain a result, and taking the result as a ratio of the property;

adding ratios of all properties to obtain a total ratio;

dividing the ratio of each property by the total ratio to obtain a weight of the property; and N properties with the largest weights are taken as the intermediate result of the property of the user.

11. The system of claim 9, wherein when the social network platform function is a webpage short URL, the social network platform function at the process A2) is a webpage short URL whose a ratio of the number of forwarding operation of the webpage short URL to the number of original creations of the webpage short URL is larger than a predefined threshold.

* * * * *